(12) United States Patent
Hills et al.

(10) Patent No.: US 6,581,000 B2
(45) Date of Patent: Jun. 17, 2003

(54) POSITION LOCATION SYSTEM AND METHOD

(75) Inventors: Alexander H. Hills, Palmer, AK (US); Jon P. Schlegel, Vienna, VA (US); Mitchell A. Rappard, Clifton, NJ (US)

(73) Assignee: Carnegie Mellon University, Pittsburgh, PA (US)

(*) Notice: Subject to any disclaimer, the term of this patent is extended or adjusted under 35 U.S.C. 154(b) by 0 days.

(21) Appl. No.: 09/754,604

(22) Filed: Jan. 4, 2001

(65) Prior Publication Data

US 2002/0087264 A1 Jul. 4, 2002

(51) Int. Cl.[7] .............................. G01G 21/26
(52) U.S. Cl. ............... 701/207; 701/200; 73/178 R; 340/988
(58) Field of Search .................. 701/207, 200, 701/208, 211, 213; 73/178 R; 340/988, 990

(56) References Cited

U.S. PATENT DOCUMENTS

| | | | |
|---|---|---|---|
| 4,053,755 A | 10/1977 | Sherrill | |
| 4,866,617 A * | 9/1989 | Matsuda et al. | 180/169 |
| 5,075,693 A | 12/1991 | McMillan et al. | |
| 5,402,365 A | 3/1995 | Kozikaro et al. | |
| 5,469,158 A | 11/1995 | Morita | |
| 5,583,776 A * | 12/1996 | Levi et al. | 701/200 |
| 5,590,604 A * | 1/1997 | Lund | 104/124 |
| 5,598,783 A * | 2/1997 | Lund | 104/124 |
| 5,687,136 A * | 11/1997 | Borenstein | 367/116 |
| 5,848,373 A * | 12/1998 | DeLorme et al. | 340/990 |
| 5,917,449 A | 6/1999 | Sanderford et al. | |
| 5,977,885 A * | 11/1999 | Watanabe | 340/988 |
| 5,983,161 A * | 11/1999 | Lemelson et al. | 340/436 |
| 6,035,253 A * | 3/2000 | Hayashi et al. | 340/995 |
| 6,047,235 A * | 4/2000 | Hiyokawa et al. | 340/988 |
| 6,125,326 A * | 9/2000 | Ohmura et al. | 342/457 |
| 6,132,391 A * | 10/2000 | Onari et al. | 600/595 |
| 6,167,346 A * | 12/2000 | Fukawa | 342/357.13 |
| 6,218,961 B1 * | 4/2001 | Gross et al. | 246/122 R |
| 6,240,366 B1 * | 5/2001 | Nagatsuma et al. | 342/357.01 |
| 6,246,362 B1 * | 6/2001 | Tsubata et al. | 342/357.08 |
| 6,259,990 B1 * | 7/2001 | Shojima et al. | 340/825.19 |
| 6,275,773 B1 * | 8/2001 | Lemelson et al. | 340/436 |
| 6,289,278 B1 * | 9/2001 | Endo et al. | 340/988 |
| 6,330,503 B1 * | 12/2001 | Sharp et al. | 173/1 |
| 6,336,072 B1 * | 1/2002 | Takayama et al. | 340/995 |
| 6,351,706 B1 * | 2/2002 | Morimoto et al. | 340/995 |
| 6,356,835 B2 * | 3/2002 | Hayashi et al. | 340/988 |
| 6,356,838 B1 * | 3/2002 | Paul | 701/201 |
| 6,405,123 B1 * | 6/2002 | Rennard et al. | 340/988 |
| 6,442,507 B1 | 8/2002 | Skidmore et al. | |

FOREIGN PATENT DOCUMENTS

| EP | 0 060 361 A1 | 9/1982 |
|---|---|---|
| EP | 09036609 | 9/1998 |

* cited by examiner

Primary Examiner—William A. Cuchlinski, Jr.
Assistant Examiner—Olga Hernandez
(74) Attorney, Agent, or Firm—Kirkpatrick & Lockhart LLP

(57) ABSTRACT

A system for determining a position of a user. The system includes a distance sensor in communication with a position tracking device. The distance sensor is for detecting movement by the user, and the position tracking device is for determining the position of the user based on detection of movement by the user and a relative change in direction input from the user.

10 Claims, 8 Drawing Sheets

POSITION LOCATION SYSTEM AND METHOD

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF INVENTION

1. Field of Invention

The present invention is directed generally to position location systems and methods.

2. Description of the Background

There are a number of position location systems well suited for applications that require the determination of a position location in an outdoor environment. However, because position location systems vary considerably in terms of accuracy, size, complexity, cost, and ease of use, many of these systems have shortcomings when used to determine position locations situated in an indoor environment. For example, global positioning systems (GPS), magnetic compass systems, and inertial navigation systems each have shortcomings when used for applications requiring the determination of a position location in an indoor environment.

Global positioning systems rely on modulated carrier signals transmitted from GPS satellites and received by a GPS receiver to determine position location. Information that is decoded to determine position location is carried by modulation signals that are mixed with two carrier signals. The two carrier signals, commonly known as L1 and L2, are transmitted at frequencies that are not particularly effective at passing through the exterior shell of a building. If no signal is received at the GPS receiver, the global positioning system is unable to determine position location. Therefore, global positioning systems are ill-suited for determining position locations in an indoor environment due to the attenuating effect that the exterior shell of the building has on the carrier signals.

Magnetic compass systems rely on a magnetic compass to indicate a direction of movement of an object. From the direction of indicated movement, a new position location relative to a previous position location can be determined. However, when used to determine position location in an indoor environment, magnetic compass systems are susceptible to inaccuracies resulting from a biasing effect that magnetic material in the building may have on the compass. For buildings constructed with structural steel members, the inaccuracies of the magnetic compass system can be very pronounced.

Although inertial navigation systems may be built to determine an accurate indoor position location, inertial navigation systems generally incorporate a large number of mechanical components, such as accelerometers and gyroscopes, thereby tending to cause inertial navigation systems to be relatively bulky, unwieldy, and expensive.

Thus, there exists a need for a position location system that overcomes the limitations, shortcomings, and disadvantages of known position location systems.

BRIEF SUMMARY OF THE INVENTION

The present invention is directed to a system for determining a position of a user. According to one embodiment, the system includes a distance sensor in communication with a position tracking device. The distance sensor is for detecting movement by the user, and the position tracking device is for determining the position of the user based on detection of movement by the user and a relative change in direction input from the user.

According to another embodiment, the system includes: a distance sensor for detecting movement by the user; an input device for allowing the user to enter a relative change in direction input; a position tracking module in communication with the distance sensor and the input device for determining the position of the user based on detection of the movement by the user and the relative change in direction input; and an output device in communication with the position tracking module for displaying the position of the user. According to another embodiment, the system may additionally include a radio receiver and a radio coverage mapping module in communication with the radio receiver and the position tracking module.

According to yet another embodiment, the present invention is directed to a method for determining a position of a user. The method includes receiving a relative change in direction input from the user via a graphical user interface, determining a distance traversed by the user, determining the position of the user based on the relative change in direction input from the user and the distance traversed by the user, and displaying the position of the user via the graphical user interface.

The present invention, in contrast to prior art position location systems, provides an efficient, inexpensive, and relatively accurate technique for determining and tracking the position of a user. In addition, unlike many prior art position location systems, the techniques of the present invention are operable in indoor environments. Consequently, the present invention may be used advantageously, for example, by wireless local access network (WLAN) designers in determining the appropriate positions for access points of the network.

BRIEF DESCRIPTION OF THE DRAWINGS

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements of a conventional position location system. For example, certain operating system details and modules contained in the processor of the position location system are not shown. Those of ordinary skill in the art will recognize, however, that these and other elements may be desirable. However, because such elements are well known in the art, and because they do not facilitate a better understanding of the present invention, a discussion of such elements is not provided herein.

Figure 1:
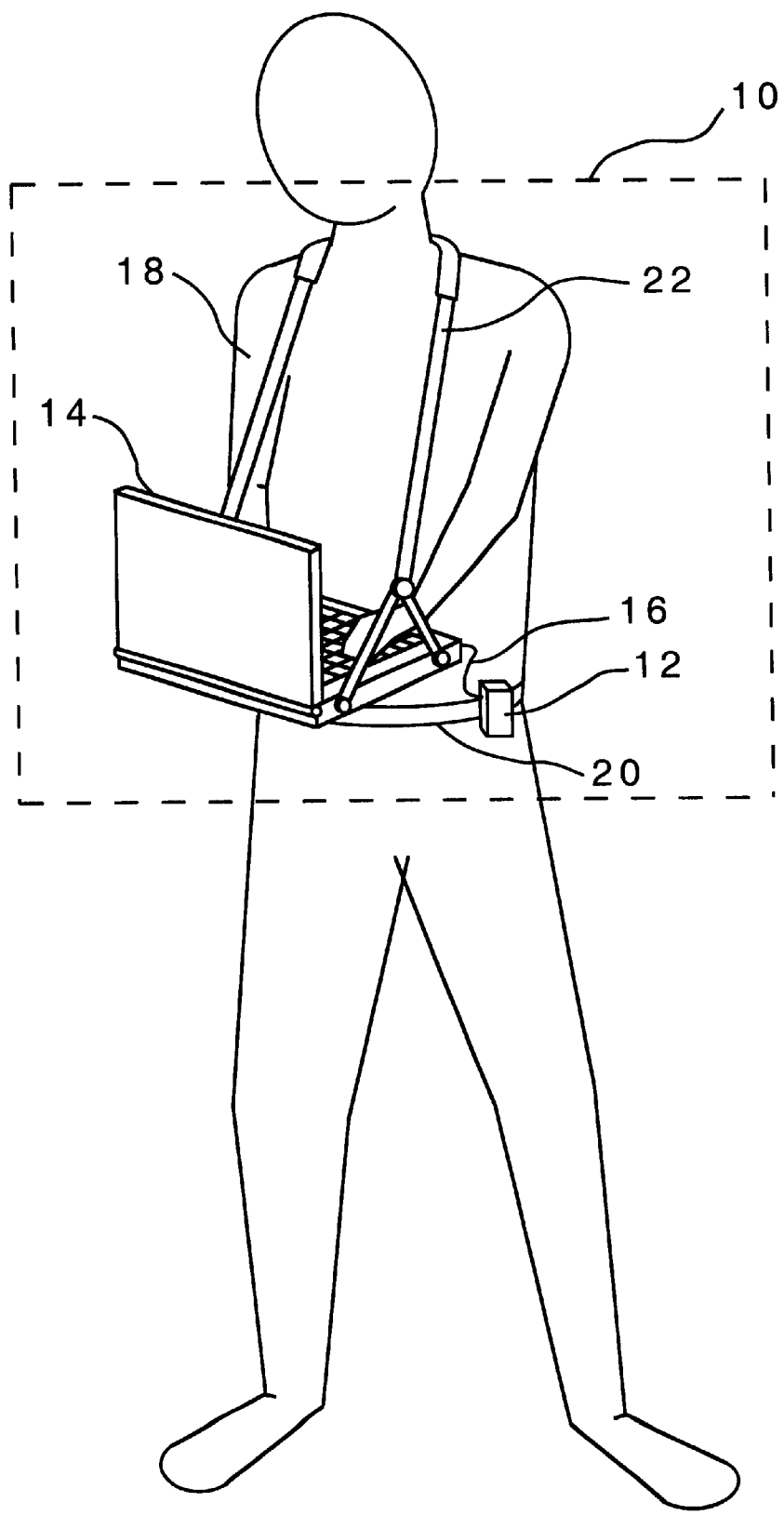
FIG. 1 illustrates a position location system according to one embodiment of the present invention.

FIG. 1 illustrates one embodiment of a position location system 10 according to the present invention. The position location system 10 includes a distance sensor 12, a position tracking device 14, and a communications link 16. The position location system 10 may be used to determine the real-time position of a user 18 of the system 10, as described further hereinbelow.

The distance sensor 12 is for detecting movement by the user 18. The distance sensor 12 may be implemented as any type of device capable of detecting movement by the user 18, and may further transmit an indication to the position tracking device 14 when movement by the user 18 is detected. According to one embodiment, the distance sensor 12 may be a stride detector adapted to detect a stride taken by the user 18 and transmit an indication to the position tracking device 14 each time the user takes a stride. The stride detector may include, for example, an accelerometer, a vibration detector, or a pressure-activated switch such as, for example, a normally-open pressure activated switch, for detecting each stride taken by the user 18. The stride detector may be worn by the user 18 such as, for example, around the wrist of the user 18, on an article of clothing of the user 18, such as a belt 20 as illustrated in FIG. 1, or on footwear of the user 18. When the stride detector is worn on the belt 20 of the user 18, the stride detector may be positioned near the user's back.

According to another embodiment, the position tracking device 14 may be located in a movable cart (not shown), which the user 18 may push. According to such an embodiment, the distance sensor 12 may be, for example, an odometer adapted to sense rotation of a wheel of the cart. The odometer, which may be in communication with the position tracking device 14 via the communications link 16, may transmit to the position tracking device 14 an indication of the amount of rotation of the wheel of the cart. According to another embodiment, the distance sensor 12 may be an odometer adapted to detect rotation of a surveyor's wheel (not shown) that is pushed by the user 18.

The position tracking device 14 may be configured to receive the indication that is transmitted by the distance sensor 12 and, based thereon, determine the real-time position of the user 18. The position tracking device 14 may be embodied as, for example, a mobile computing device such as a laptop computer or a personal digital assistant, and will be described in more detail hereinbelow with reference to FIG. 2.

The communications link 16 may serve as a line or channel over which the distance sensor 12 transmits the indication of user movement to the position tracking device 14. According to one embodiment, as illustrated in FIG. 1, the communication link 16 may be a hard-wired connection such as, for example, a RS-232 connection. According to another embodiment, the communications link 16 may be a wireless communications link such as, for example, a radio interface utilizing the Bluetooth™ short-range radio communications scheme.

The position location system 10 may further include a support 22, such as a harness, for supporting the position tracking device 14 on the user 18. According to one embodiment, as illustrated in FIG. 1, the support 22 may be worn around the neck of a person and may be attached to the position tracking device 14 at one or more points. According to another embodiment, as discussed hereinbefore, the position tracking device 14 may be supported by a platform of a wheeled cart, which may be pushed by the user 18.

Figure 2:
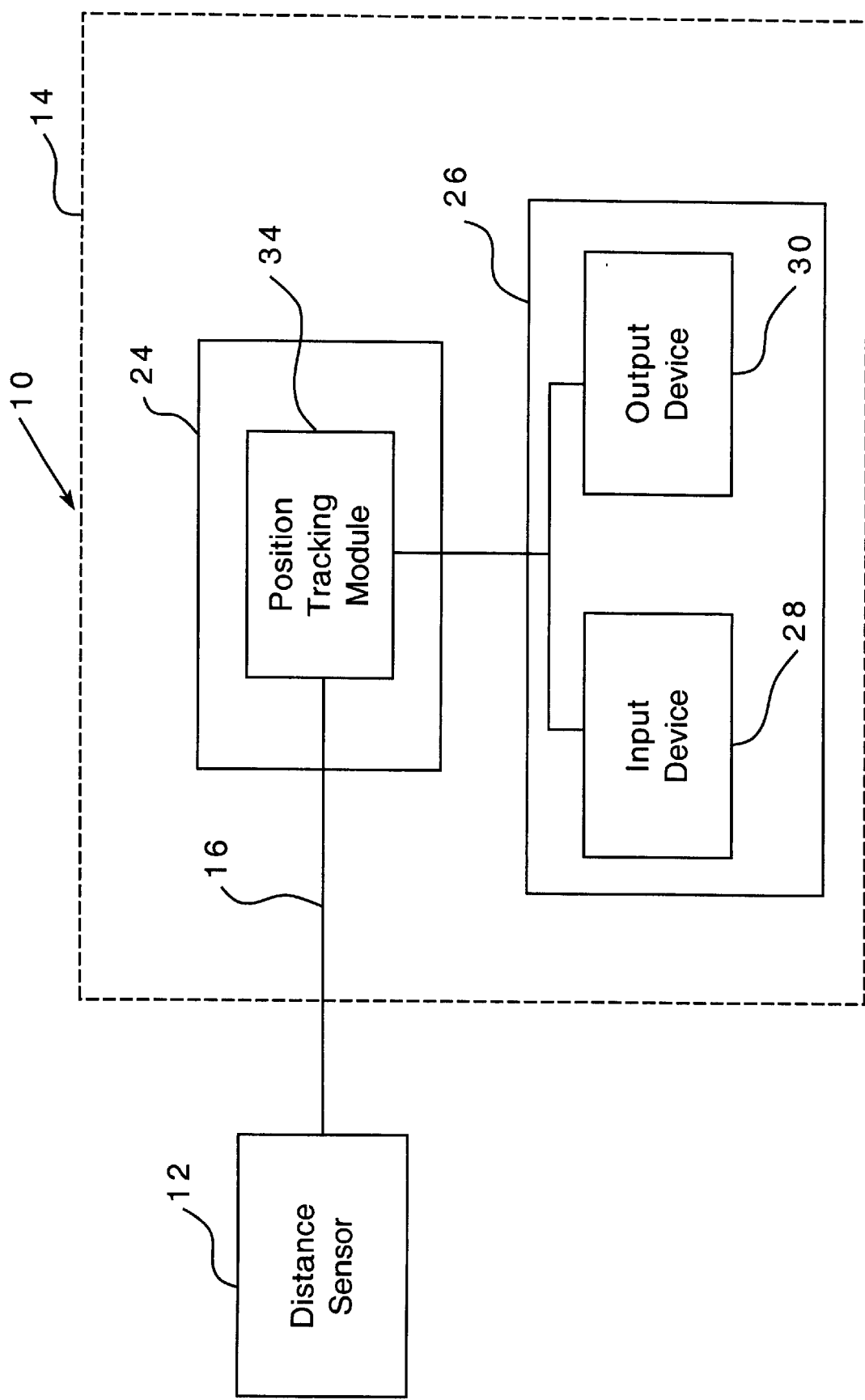
FIG. 2 is a block diagram of the position location system of FIG. 1 according to one embodiment of the present invention.

FIG. 2 is a block diagram of the position location system 10 of FIG. 1 according to one embodiment of the present invention. According to the illustrated embodiment, the position tracking device 14 may include a processor 24 and an interface device 26 coupled to the processor 24. The interface device 26 may include an input device 28 and an output device 30. The input device 28 may include any type of device such as, for example, a keyboard, a mouse, a trackball, a light pen, a touch screen, or any combination thereof, suitable for inputting data. The output device 30 may include any type of device such as, for example, a display screen that utilizes CRT or LCD technologies, capable of displaying textual and/or graphical information. The display screen may include a map panel having a plurality of pixels, wherein the map panel graphically displays the position of the user 18. In conjunction, the input and output devices of the interface device 26 may provide a graphical user interface (GUI) for the user 18, through which the user 18 may input data, such as a relative change in direction input, and which may graphically display the position of the user 18.

The processor 24 may be a central processing unit (CPU) including, e.g., a microprocessor, an application specific integrated circuit (ASIC), or one or more printed circuit boards. The processor 24 may include a position tracking module 34 for tracking the position of the user 18 based on detection of the movement of the user 18 and a relative change in direction input from the user 18, as described further hereinbelow.

The position tracking module 34 may be implemented as microcode configured into the logic of the processor 24, or may be implemented as programmable microcode stored in an electrically erasable programmable read only memory (EEPROM). According to another embodiment, the position tracking module 34 may be implemented as software code to be executed by the processor 24. The software code may be written in any suitable programming language using any suitable programming technique. For example, the software code may be written in C using procedural programming techniques, or in Java or C++ using object oriented programming techniques. The software code may be stored as a series of instructions or commands on a computer readable medium, such as a random access memory (RAM) or a read only memory (ROM), a magnetic medium such as a hard-drive or a floppy disk, or an optical medium such as a CD-ROM.

According to one embodiment, the position tracking device 14 may be always in one of two states: a paused state or a live state. According to such an embodiment, when the position tracking device 14 is initially powered up, it may be in the paused state. While in the paused state, the position tracking device 14 may ignore any indications transmitted by the distance sensor 12. Consequently, movement by the user 18 that user 18 does not want the position tracking device 14 to track and record may be ignored while the position tracking device 14 is in the paused state. When the user 18 is ready to have the position tracking device 14 track his position, the user 18 may transition the position tracking device 14 from the paused to the live state using, for example, a touch screen button on a display screen of the GUI.

Figure 3:
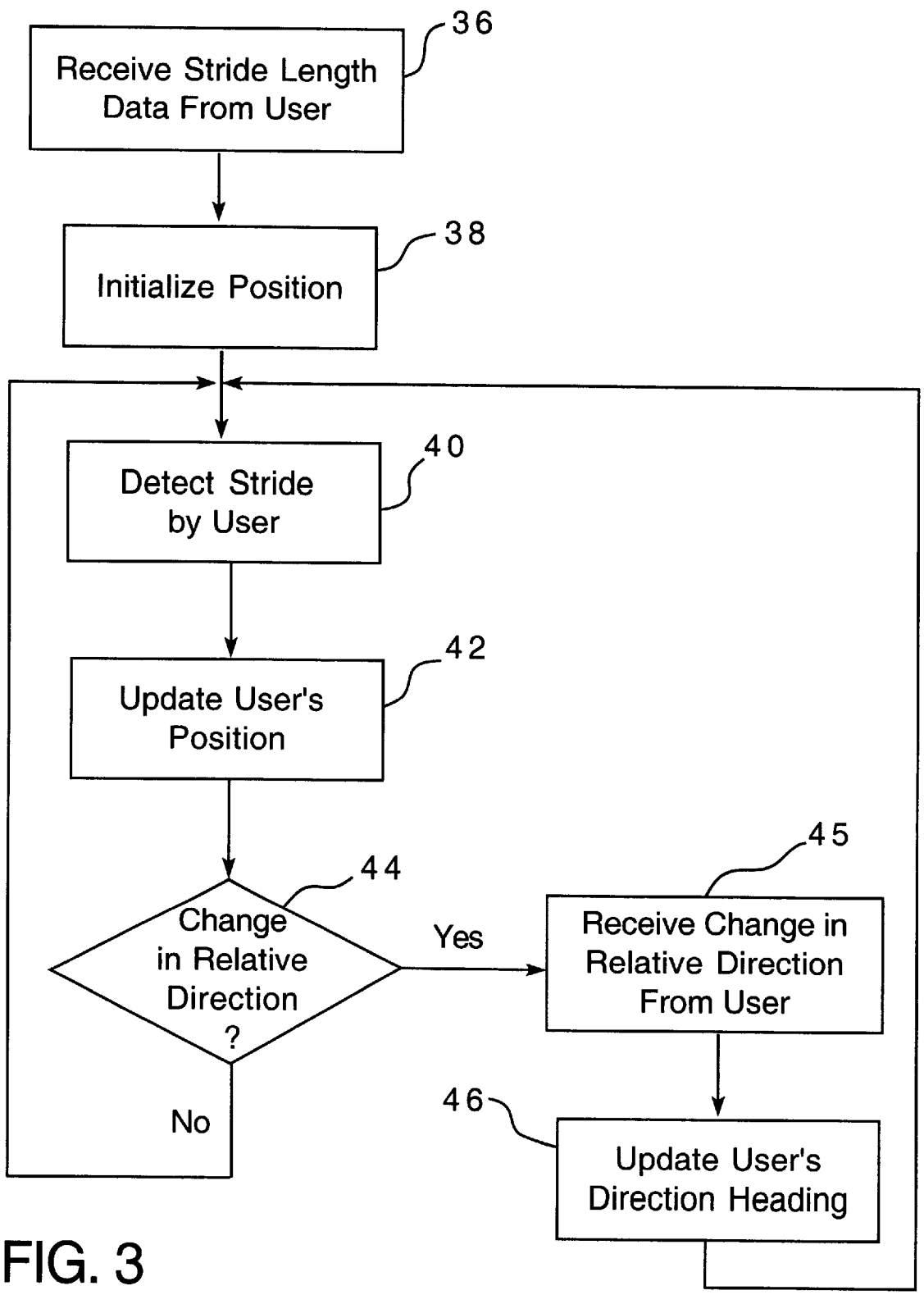
FIG. 3 is a flowchart illustrating the process flow through the position tracking module of FIG. 2 according to one embodiment of the present invention.

FIG. 3 is a flowchart illustrating the process flow through the position tracking module 34 according to one embodiment of the present invention. In the illustrated embodiment of the process flow, the distance sensor 12 is a stride detector, although, as discussed hereinbefore, the distance sensor 12 may be any device capable of detecting movement by the user 18 such as, e.g., an odometer. The process flow of FIG. 3 begins at block 36 where, according to such an embodiment, the user 18 inputs the user's stride length to the position tracking module 34 using the input device 28. The user 18 may accurately ascertain the stride length by counting the number of strides it takes to cover a known distance, and then dividing the known distance by the number of strides. More accurate determinations of the user's stride length may be achieved by performing this exercise several times and computing an average thereof. It should be noted that if the user's actual stride length varies from the data input to the position tracking device 14 while using the system 10, the ultimate position determined by the system 10 will be off by a scale factor corresponding to the difference between the user's actual stride length and the input stride length data.

From block 36 the process advances to block 38, where the position tracking module 34 initializes the user's position. This step may result from the user 18 inputting data via the GUI to transition the position tracking device 14 from the paused state to the live state to thereby beginning tracking the position of the user 18. The position tracking module 34 may initialize the user's position with an arbitrary reference point and with an arbitrary direction heading such as, for example, zero degrees.

From block 38 the process advances to block 40, where the position tracking module 34 receives an indication from the stride detector 12 that the user 18 has taken a stride. From block 40 the process advances to block 42, where the position tracking module 34 updates the user's real-time position according to a dead reckoning algorithm based on (i) the current stride length of the user 18, (ii) the current direction heading of the user (which is an arbitrary direction for the first time through the loop), and (iii) the indication received from the stride detector 12 at block 40. In making this calculation, the position tracking module 34 may assume that the user's stride was taken in a direction corresponding to the current direction heading of the user 18. Thus, the updated position of the user 18 represents the updated position of the user 18 relative to the previous position of the user 18 (which is the arbitrary reference point for the first time through the loop.)

From block 42 the process advances to block 44 where the position tracking module 34 determines whether the user 18 has entered a relative change in direction input, indicating that the user 18 intends to change the direction of his travel. Such a change in direction may be input by the user 18 via the input device 28. If not, the process returns to block 40 and the process repeats itself to thereby update the user's position after his second stride in the same direction as before, and so on.

Conversely, if at block 44 the position tracking module 34 determines that the user 18 has entered a relative change in direction input, the process advances to block 45 where the position tracking module 34 receives data corresponding to the user's change in direction relative to his prior direction.

The relative change in direction input may be entered by the user 18 via the input device 28. According to one embodiment, the user 18 may enter the relative change in direction input by pressing a left or right arrow key on the graphical user interface. According to this embodiment, the position tracking module 34 may change the direction heading of the user 18 by a predetermined increment in response to each pressing of an arrow key by the user 18, and the predetermined increment may be any amount greater than 0 degrees but less than or equal to 90 degrees. For example, if the user 18 presses a right arrow key on the graphical user interface, and the predetermined increment associated with the pressing of the arrow key is forty-five degrees, the position tracking module 34 may change the relative direction of the user 18 by forty-five degrees to the right of the previous direction heading. Similarly, if the user 18 presses a right arrow key twice, the position tracking module 34 may change the direction heading of the user 18 by ninety degrees (forty-five degrees+forty-five degrees) to the right relative to the user's previous direction heading. Entering a relative change in direction input according to such a fashion is simpler than having to input a new absolute direction heading each time the user 18 intends to change direction.

From block 45 the process may advance to block 46, where the position tracking module 34 may update the user's current direction heading by adding the user's relative change in direction input to his previous direction heading. For indoor environments having a generally rectangular shape, the indoor environment may be used as a frame of reference for the user 18 to minimize potential errors between the calculated direction heading and the user's actual direction of travel. From block 46 the process may return to block 40 in order that the process may repeat such that the user's travel in the new direction may be tracked.

According to one embodiment, as the user 18 traverses the environment, the position tracking module 34 may output the user's updated, real-time position to the output device 30 such that the user 18 may be provided a graphical, updated map of the environment. According to such an embodiment, the output device 30 may include a map panel on which the position of the user 18 may be tracked relative to the initial reference point.

According to one embodiment, the position tracking device 14 may further include an automatic pause function that automatically changes the state of the position tracking device 14 from the live state to the paused state when the user 18 enters a relative change in direction input (see block 45, FIG. 3). The automatic pause function may minimize errors related to stride detector false alarms and user shuffle-steps, which may occur while the user 18 physically makes a turn in direction.

According to another embodiment, the position tracking module 34, rather than merely tracking movement from an initial reference point, may track the user's position relative to intermediate reference points. Such intermediate reference points are referred to herein as "waypoints." Waypoints may represent previous positions of the user 18, thus allowing the user 18 to map a new direction from a intermediate starting point, rather than from the user's initial starting position. Further, the input device 28 may allow the user 18 to label the waypoints with identifying names such as, for example, "stairwell," "main entrance," etc.

Figure 4:
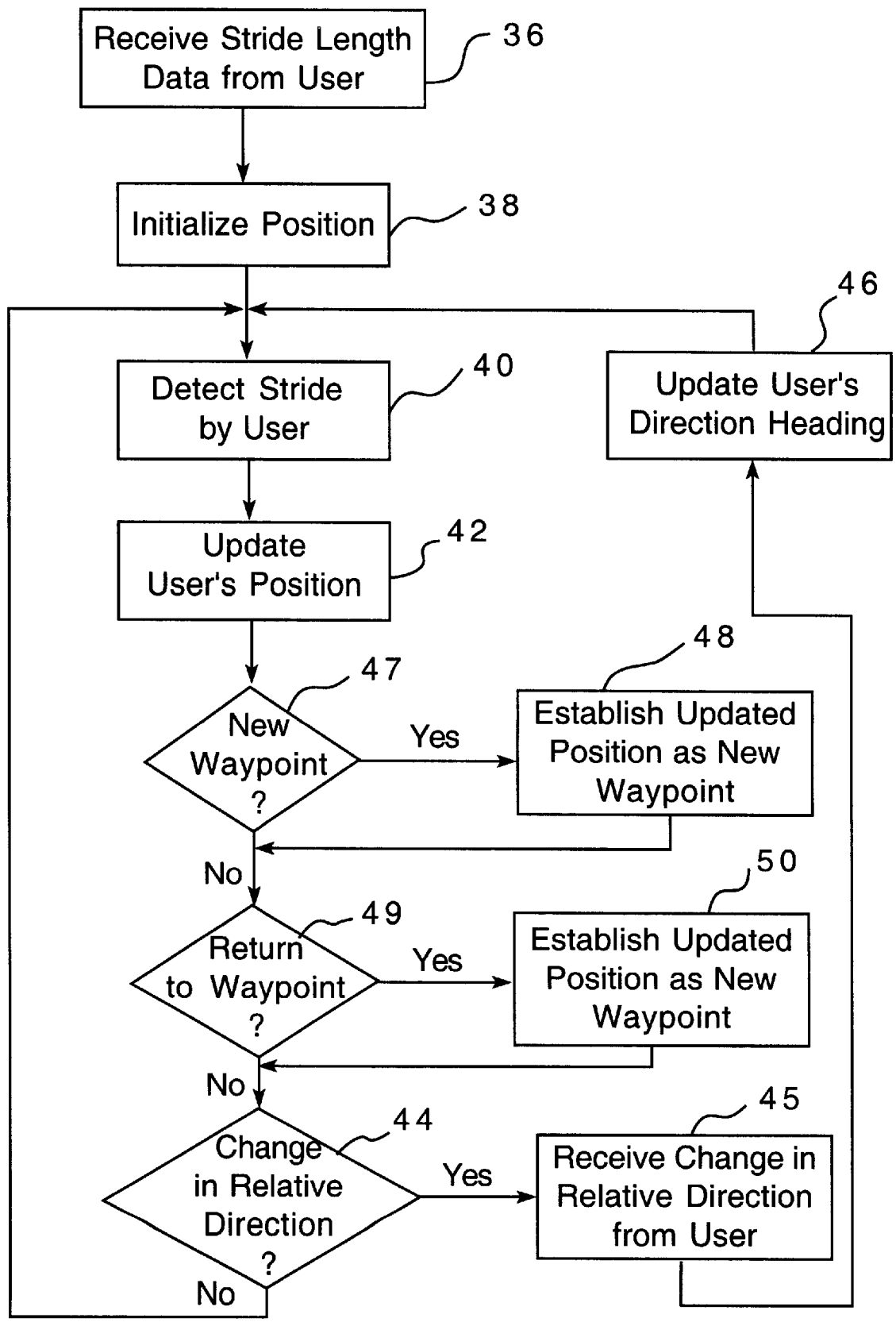
FIG. 4 is a flowchart illustrating the process flow through the position tracking module of FIG. 2 according to another embodiment of the present invention.

FIG. 4 is a flow chart of the process flow through the tracking module 34 according to such an embodiment. Again, for the illustrated embodiment, the distance sensor 12 is a stride detector. The illustrated process flow is similar to that of FIG. 3, except that from block 42, the process may advance to block 47 where the user 18 may instruct the position tracking module 34 to designate the user's currently updated position as a new waypoint. The user may so instruct the position tracking module 34 via the input device 30. If the user 18 does so instruct the position tracking module 34, the process advances to block 48 where the user 18 may identify the new waypoint, such as with a name or identifying number using the input device 28. For example, according to one embodiment, a particular location may be designated as a waypoint by pressing an "Insert Waypoint" button on the GUI. After the "Insert Waypoint" button is pressed, a dialog box may appear asking for a name to be assigned to the newly designated waypoint.

After the user 18 identifies the new waypoint at block 47 or if the user 18 chooses not to designate his current position as a waypoint, the process advances to block 49 where the user 18 may indicate whether he wishes to track his position relative to his currently updated position or whether he wishes to track his position relative to a prior position, i.e., a waypoint. If the user 18 indicates that he does not wish to return to a waypoint, the process proceeds through the steps of tracking position as described hereinbefore with respect to FIG. 3. Conversely, if the user 18 indicates at block 49 that he does wish to return to a waypoint, the process advances to block 50 where the user 18 may select a previously designated waypoint. According to one embodiment, the user 18 may select a waypoint from the previously designated waypoints (see block 48) from a conventional drop-down window of the GUI. The user 18 may then physically return to the waypoint with the position tracking device 14 in the paused state. Upon arriving at the waypoint, the user 18 may transition the position tracking device 14 from the paused state to the live state. Having selected a waypoint at block 50, the process proceeds to block 44.

Waypoints are useful in eliminating small amounts of user error that may occur during the use of the system 10. For example, if a user 18 makes an error and wishes to delete the position tracking data representative of the path traversed between the position of the user 18 and an established waypoint, the user 18 may do so using the waypoints. According to one embodiment, the user 18 may do so by first selecting a "utilities" menu located on the GUI to access a drop-down menu. The user 18 may then select a "Go Back to Waypoint" item from the drop-down menu. A list of the established waypoints may then be displayed. When the appropriate waypoint has been selected and an "OK" button is selected, the position tracking data representative of the path traversed from the selected waypoint to the current position of the user 18 may be deleted, and the graphical representation of the path traversed from the selected waypoint to the most recent position may be removed from the map panel of the display screen.

In addition, in certain applications it may be desirable for the user 18 to return to a previously established waypoint without having any recorded position tracking data deleted. According to one such embodiment, the user 18 may do so by first selecting the "utilities" menu located on a Graphical User Interface to access a drop-down menu. The user 18 may then select a "Set Position to Waypoint" item from the drop-down menu. A list of the established waypoints may then be displayed. When the appropriate waypoint has been selected and an "OK" button is selected, the position tracking module 34 may change the position of the user 18 to the position associated with the selected waypoint without deleting any recorded position tracking data or having any graphical representations of the path traversed from the selected waypoint to the most recent position of the user 18 removed from the map panel of the display screen.

In addition, according to one embodiment, at any time during the above-described flow process, all of the recorded position tracking data may be deleted. According to such an embodiment, the position location data may be deleted by pressing a "Reset" button on the GUI.

According to other embodiments of the present invention, as discussed hereinbefore, the distance sensor 12 may be, e.g., an odometer. According to such an embodiment, the process flows of FIGS. 3 and 4 may be modified such that the position tracking module 34 may track the user's position based on data from the odometer. For instance, at block 36 of FIG. 3, the circumference of the wheel may be entered rather than the user's stride length. In addition, at block 40, the position tracking module 34 may receive an indication as to the amount of rotation by the wheel.

Figure 5:
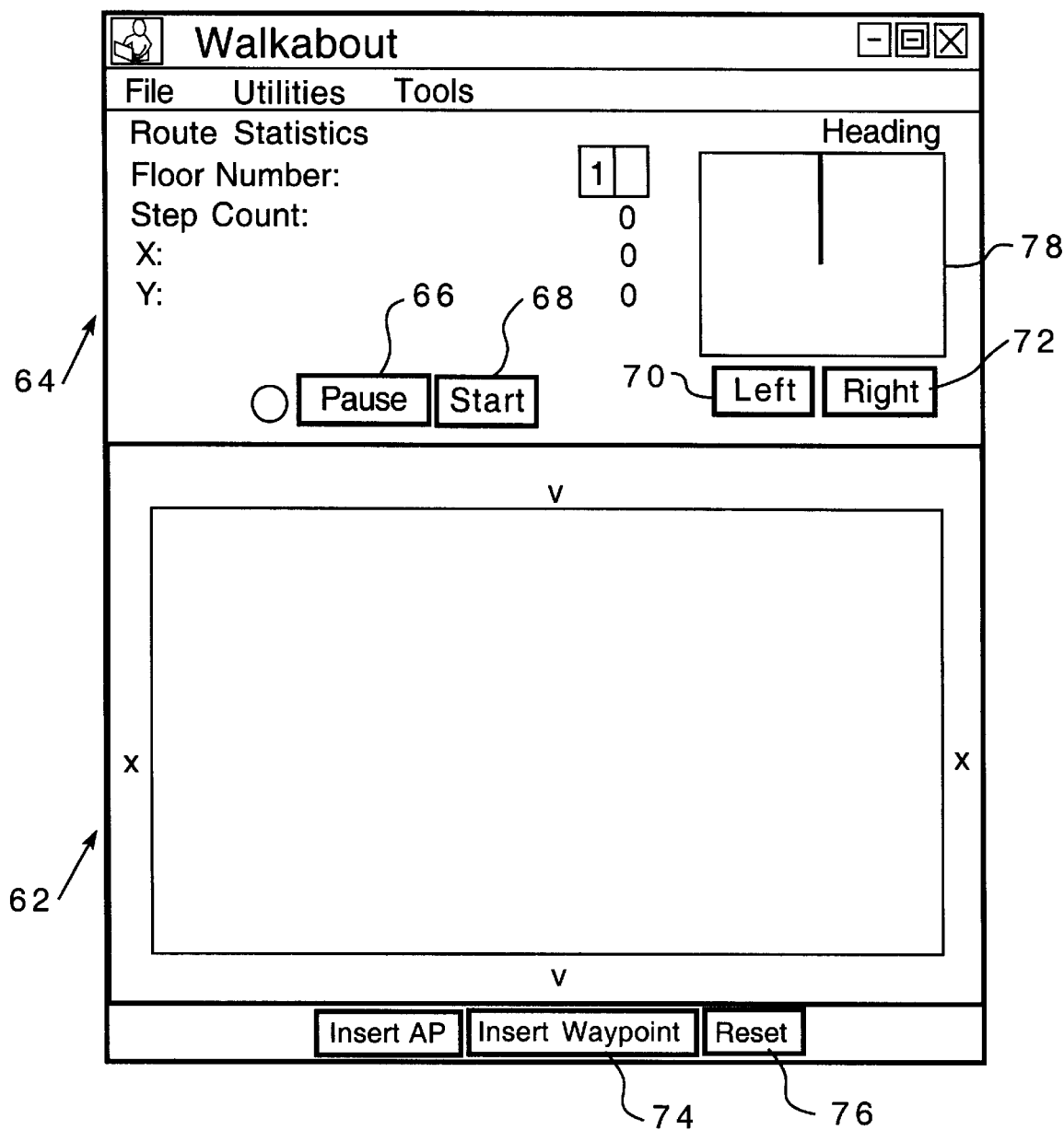
FIGS. 5–7 are examples of screen shots of a graphical user interface for the position tracking device of FIG. 1 according to one embodiment of the present invention.
Figure 6:
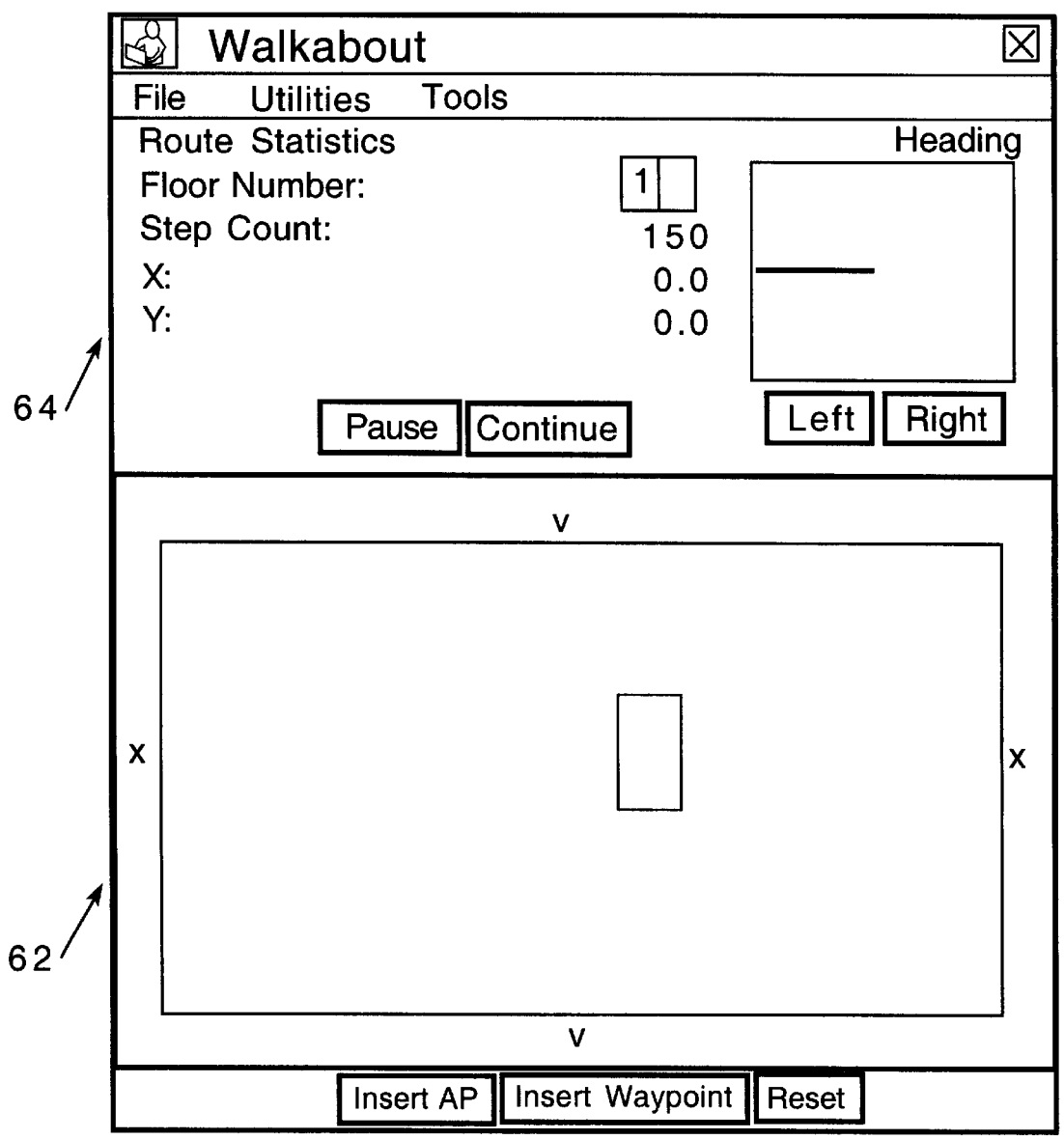
Figure 7:

FIGS. 5–7 are examples of screen shots of the GUI for the position tracking device 14 according to one embodiment of the present invention. In FIG. 5, the screen shot shows the map panel 62, textual data 64, and other elements of the graphical user interface. The textual data 64 that is displayed includes, for example, the (x, y) coordinates of the position of the user 18. Additional elements of the graphical user interface include, for example, pause and start buttons 66, 68, left and right buttons 70, 72 for entering the direction heading, an insert waypoint button 74, and a reset button 76. The GUI also may include a graphical display of the direction heading 78.

In FIG. 6, the textual data 64 of the GUI indicates that the user 18 has taken one-hundred fifty steps. The graphical representation of the path traversed by the user 18 is shown as a rectangle on the map panel 62. FIG. 7 shows a graphical list of previously designated waypoints. The list includes information such as the assigned name of the waypoint, and the (x, y) coordinates of the waypoints.

Figure 8:
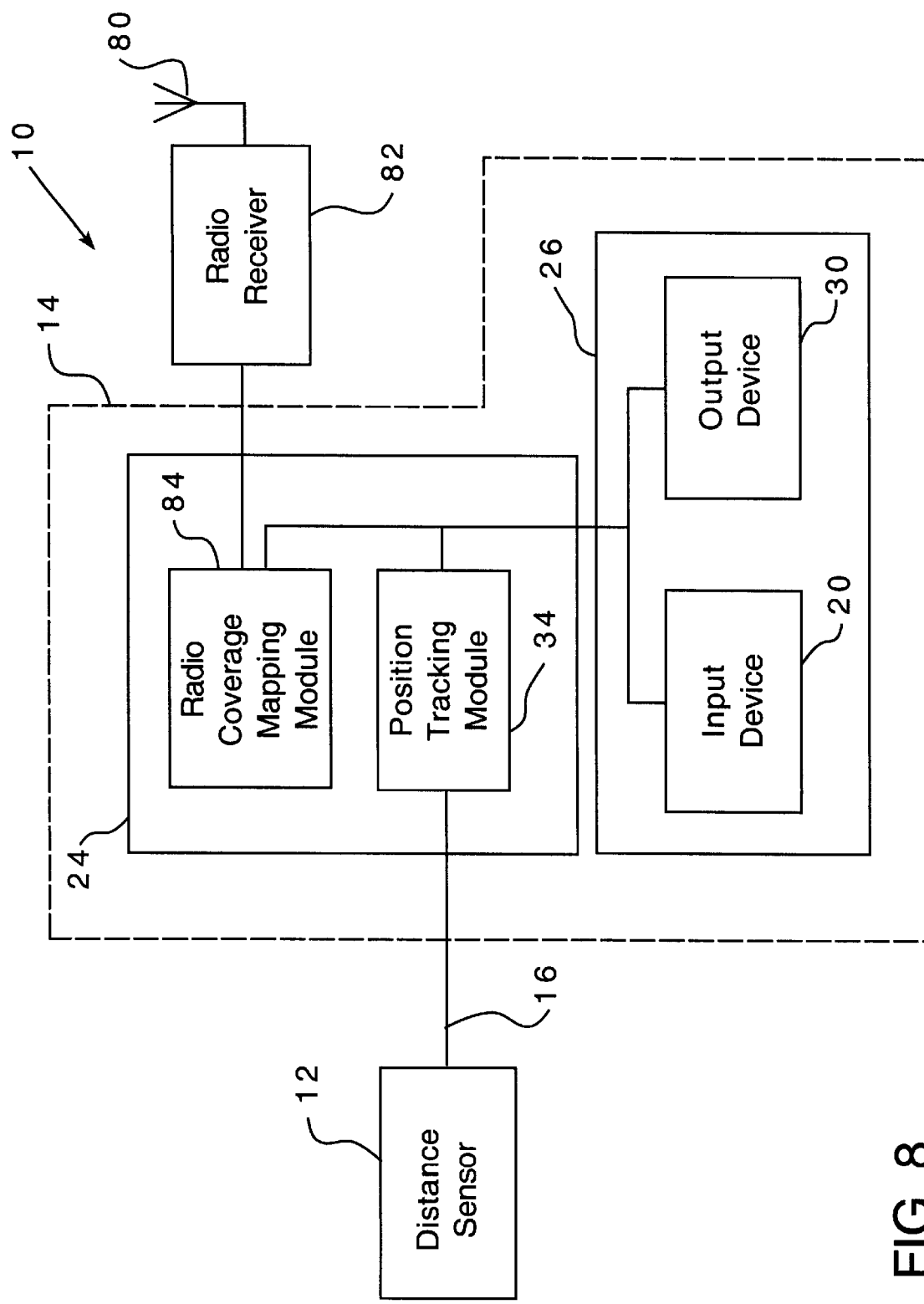
FIG. 8 is a block diagram of the position location system according to another embodiment of the present invention.

FIG. 8 is a block diagram of the position location system 10 according to another embodiment of the present invention. The illustrated embodiment is similar to that of FIG. 2, except that the position tracking device 14 also includes an antenna 80, a radio receiver 82, and a radio coverage mapping module 84. According to such an embodiment, the position location system 10 of FIG. 8 may be used, for example, in connection with the design of a wireless local area network (WLAN) in an indoor environment. The design process for a WLAN typically includes generating a set of signal strength measurements for the environment. Such a set of signal strength measurements may be generated by placing a radio base station at a particular location in the environment and measuring the strength of radio signals transmitted therefrom at various points in the environment.

According to such an embodiment, the receiver 82 may receive radio signals transmitted by the radio base station. The radio coverage mapping module 84, which may include digital signal processor (DSP) functionality, may measure the signal strength of received radio signals and, with input of the user's position from the position tracking module 34, generate a table of the measured signal strength at each position of the user 18. Consequently, the position tracking system 10 of FIG. 8 may be utilized to map the radio coverage pattern for a radio base station, such as an access point of a WLAN, at a particular location in the environment. This process may be repeated for other radio base station locations within the environment. With this information, WLAN designers may better gauge the radio attenuation characteristics of the environment, and thereby more efficiently plan the layout of the access points of the WLAN.

Although the present embodiment has been described herein with reference to certain embodiments, those of ordinary skill in the art will recognize that many modifications and variations of the present invention may be implemented without departing from the spirit and scope of the present invention. For example, certain steps of the processes of FIGS. 3 and 4 may be performed in different sequences. In addition, according to another embodiment, the radio coverage mapping module 84 may include a separate DSP. The foregoing description and the following claims are intended to cover all such modifications and variations.

What is claimed is:

1. A method for determining a position of a user, comprising:

receiving a relative change in direction input from the user via a graphical user interface;

determining a distance traversed by the user, wherein determining the distance traversed by the user is selected from the group consisting of detecting rotation of a wheel and detecting a stride by the user;

determining the position of the user based on the relative change in direction input from the user and the distance traversed by the user; and displaying the position of the user via the graphical user interface.

2. A method for determining a position of a user, comprising:

receiving a relative change in direction input from the user via a graphical user interface;

determining a distance traversed by the user;

determining the position of the user based on the relative change in direction input from the user and the distance traversed by the user, wherein determining the position of the user includes determining the position of the user relative to a reference point based on the relative change in direction input from the user and the distance traversed by the user, wherein the reference point is selected from the group consisting of an initial reference point and a waypoint; and displaying the position of the user via the graphical user interface.

3. A method for determining a position of a user, comprising:

receiving a relative change in direction input from the user via a graphical user interface;

determining a distance traversed by the user;

determining the position of the user based on the relative change in direction input from the user and the distance traversed by the user;

displaying the position of the user via the graphical user interface;

receiving a radio signal transmitted by a radio transmitter; and determining a radio coverage pattern of the radio transmitter based on a strength of the received radio signal and the position of the user.

4. A system for determining a position of a user, comprising:

a distance sensor for detecting stride movement by the user based on rotation of a wheel pushed by the user; and a position tracking device in communication with the distance sensor for determining the position of the user based on detection of stride movement by the user and a relative change in direction input from the user.

5. The system of claim 4, wherein the distance sensor includes an odometer.

6. The system of claim 4, wherein the distance sensor is in communication with the position tracking device via a hard-wired communications link.

7. The system of claim 4, wherein the distance sensor is in communication with the position tracking device via a wireless communications link.

8. The system of claim 4, wherein the position tracking device includes a graphical user interface for allowing the user to enter the relative change in direction input and for displaying the position of the user.

9. The system of claim 4, further comprising a radio receiver in communication with the position tracking device.

10. The system of claim 4, further comprising a support connected to the position tracking device.

* * * * *